United States Patent
Krysiuk (10) Patent No.: US 10,962,381 B2
(45) Date of Patent: Mar. 30, 2021

(54) METHOD, APPARATUS, AND COMPUTER PROGRAM PRODUCT FOR CREATING TRAFFIC INFORMATION FOR SPECIALIZED VEHICLE TYPES

(71) Applicant: HERE Global B.V., Eindhoven (NL)

(72) Inventor: Marek Krysiuk, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 84 days.

(21) Appl. No.: 16/177,895

(22) Filed: Nov. 1, 2018

(65) Prior Publication Data
US 2020/0141748 A1 May 7, 2020

(51) Int. Cl.
G01C 21/34 (2006.01)
G08G 1/01 (2006.01)
G06N 20/00 (2019.01)
G05D 1/00 (2006.01)

(52) U.S. Cl.
CPC ..... *G01C 21/3492* (2013.01); *G01C 21/3446* (2013.01); *G06N 20/00* (2019.01); *G08G 1/0125* (2013.01); *G05D 1/0088* (2013.01)

(58) Field of Classification Search
CPC ............ G01C 21/3446; G01C 21/3492; G06N 20/00; G08G 1/0125; G05D 1/0088
USPC .......................................................... 701/23
See application file for complete search history.

(56) References Cited

U.S. PATENT DOCUMENTS

| | | |
|---|---|---|
| 9,014,888 B2 | 4/2015 | Sukkarie et al. |
| 9,387,860 B2 | 7/2016 | Dorum et al. |
| 9,779,557 B2 | 10/2017 | Hauser et al. |
| 2005/0021223 A1 | 1/2005 | Heaps et al. |
| 2009/0254241 A1 | 10/2009 | Basir |
| 2011/0224893 A1 | 9/2011 | Scofield et al. |
| 2013/0297211 A1 | 11/2013 | Burr et al. |

(Continued)

FOREIGN PATENT DOCUMENTS

DE 102011083677 A1 4/2013

OTHER PUBLICATIONS

Syed, N., *Connected Car Data: Let the Data Flow* [online] [retrieved Aug. 21, 2018]. Retrieved from the Internet: <URL: https://blogs.thomsonreuters.com/answerson/connected-car-data-open-data/>, (dated Jun. 9, 2017) 8 pages.

(Continued)

*Primary Examiner* — Atul Trivedi
(74) *Attorney, Agent, or Firm* — Alston & Bird LLP (57) ABSTRACT

A method, apparatus and computer program product are provided for creating traffic information for a specialized type of vehicle. The method may include receiving initial driving information for a generic type of vehicle along a planned traffic route. The generic type of vehicle travels along the planned traffic route in larger numbers than the specialized type of vehicle. The method further includes determining an adjustment to the initial driving information for the specialized type of vehicle along the planned traffic route. The method further includes creating a specialized driving information based on the initial driving information and the adjustment that was determined. The method still further includes providing the specialized driving information relating to the planned traffic route for the specialized type of vehicle. A corresponding apparatus and computer program product are also provided.

24 Claims, 5 Drawing Sheets

(56) References Cited

U.S. PATENT DOCUMENTS

| | | | |
|---|---|---|---|
| 2016/0001781 A1* | 1/2016 | Fung | G16H 50/20 |
| | | | 701/36 |
| 2018/0032082 A1* | 2/2018 | Shalev-Shwartz | |
| | | | B60W 50/045 |
| 2018/0075309 A1* | 3/2018 | Sathyanarayana | H04N 5/247 |
| 2018/0259968 A1* | 9/2018 | Frazzoli | G05D 1/0223 |
| 2018/0259976 A1* | 9/2018 | Williams | G01C 21/32 |
| 2018/0274927 A1* | 9/2018 | Epperlein | G01C 21/005 |
| 2018/0281817 A1* | 10/2018 | Ravichandran | B60W 50/10 |
| 2018/0283895 A1* | 10/2018 | Aikin | G08G 1/0104 |
| 2018/0293885 A1* | 10/2018 | Lee | G08G 1/091 |
| 2018/0300964 A1* | 10/2018 | Lakshamanan | G06N 3/063 |
| 2018/0322783 A1* | 11/2018 | Toyoda | G06T 19/006 |
| 2018/0341274 A1* | 11/2018 | Donnelly | H04W 4/46 |
| 2019/0138024 A1* | 5/2019 | Liang | G06K 9/6273 |
| 2019/0146508 A1* | 5/2019 | Dean | G05D 1/0274 |
| | | | 701/26 |
| 2019/0317512 A1* | 10/2019 | Zhang | B60W 60/0013 |
| 2020/0041303 A1* | 2/2020 | Friedman | G01C 21/3492 |
| 2020/0124439 A1* | 4/2020 | Fowe | G01C 21/3841 |
| 2020/0207358 A1* | 7/2020 | Katz | G06K 9/00845 |
| 2020/0210769 A1* | 7/2020 | Hou | G06K 9/6257 |

OTHER PUBLICATIONS

Extended European Search Report for Application No. EP 19 20 5978 dated Apr. 3, 2020, 8 pages.

* cited by examiner

| Normal Vehicle Speed | | Real Time capped Speed Factor | Historical capped Speed Factor | Real Time uncapped Speed Factor | Historical uncapped Speed Factor |
|---|---|---|---|---|---|
| All Speeds | 406 | 1.41 | 1.37 | 1.54 | 1.50 |
| Speeds <20 kph | 76 | 1.79 | 1.48 | 1.97 | 1.61 |
| Speeds 20-25 kph | 143 | 1.47 | 1.43 | 1.59 | 1.56 |
| Speeds 25-30 kph | 115 | 1.27 | 1.33 | 1.37 | 1.44 |
| Speeds >= 30 kph | 72 | 1.14 | 1.16 | 1.24 | 1.27 |

Figure 4

| Normal Vehicle Speed | Real Time Capped Speed Factor | Historical Capped Speed Factor | Real Time Uncapped Speed Factor | Historical Uncapped Speed Factor |
|---|---|---|---|---|
| All Speeds | 1.40 | 1.37 | 1.52 | 1.49 |
| Speeds < 25 kph | 1.56 | 1.41 | 1.69 | 1.53 |
| Speeds >= 25 kph | 1.21 | 1.30 | 1.32 | 1.42 |

Figure 5

METHOD, APPARATUS, AND COMPUTER PROGRAM PRODUCT FOR CREATING TRAFFIC INFORMATION FOR SPECIALIZED VEHICLE TYPES

TECHNOLOGICAL FIELD

Example embodiments of the present disclosure relate generally to a method and associated apparatus and computer program product for creating traffic information, and more particularly, to a method and associated apparatus and computer program product for creating traffic information for specialized vehicle types.

BACKGROUND

Navigation systems often use a compilation of data from various individual vehicles, both past and present, in order to predict traffic conditions and travel times for future routes. The information is gathered from various types of vehicle, but is typically most accurate for the most common vehicles on the road. Often specialized vehicles, such as mopeds, scooters, or the like, have vastly different travel times than an automobile, truck or other full size vehicles along the same route. However, due to the relatively small number of specialized vehicles, this difference in travel time is not generally taken into account. Indeed, many specialized vehicles are not represented on the road in sufficient numbers to obtain reliable data to create traffic information tailored to those vehicles.

BRIEF SUMMARY

A method, apparatus, and computer program product are provided for creating traffic information for specialized vehicle types. In an example embodiment, a method, apparatus and computer program product are provided that create updated driving information for specialized vehicles. In this regard, the method, apparatus, and computer program product of an example embodiment, allow for data collected by a variety of generic types of vehicles to be adjusted in a way that allows specialized types of vehicles to use the data effectively. Specialized types of vehicles may not have enough vehicles traveling along a given road to reliably create traffic data using specialized type of vehicle data alone, while the data from generic types of vehicles may not be accurate for specialized types of vehicles. The method, apparatus, and computer program product of an example embodiment allows specialized types of vehicles to use information from generic type vehicles in a reliable way.

In an example embodiment, a method is provided for creating traffic information for a specialized type of vehicle. The method includes receiving initial driving information for a generic type of vehicle along a planned traffic route, wherein the generic type of vehicle travels along the planned traffic route in larger numbers than the specialized type of vehicle. The method also includes determining an adjustment to the initial driving information for the specialized type of vehicle along the planned traffic route. The method further includes creating specialized driving information based on the initial driving information and the adjustment that was determined. The method still further includes causing the specialized driving information relating to the planned traffic route for the specialized type of vehicle to be provided.

In an example embodiment, the adjustment is based on vehicle progress information from a set of reference trips made by vehicles of the specialized type of vehicle. In such an embodiment, the adjustment may be further based on a performance factor of the specialized type of vehicle associated with traffic flow. In another example embodiment, the adjustment is further based on a performance factor of the specialized type of vehicle associated with at least one of a speed limit, a maneuver type, a traffic incident, a time of day, a weather condition, a road type, a road surface, or a number of lanes.

In an example embodiment, the adjustment is determined using a machine learning algorithm trained using the set of reference trips made by vehicles of the specialized type of vehicle. In another example embodiment, the adjustment is determined for at least one individual road link of the planned traffic route. In still another example embodiment, the specialized driving information includes at least one of a time to destination, an estimated speed, or an alternate route. In another example embodiment, the method also includes updating the set of reference trips by adding actual driving information gathered during a trip by the specialized type of vehicle on the planned traffic route.

In another embodiment, an apparatus is provided that includes at least one processor and at least one memory including computer program code instructions, the computer program code instructions configured to cause the apparatus to create traffic information for a specialized type of vehicle. The computer program instructions are configured to, when executed, cause the apparatus to receive initial driving information for a generic type of vehicle along a planned traffic route, wherein the generic type of vehicle travels along the planned traffic route in larger numbers than the specialized type of vehicle. The computer program instructions are further configured to, when executed, cause the apparatus to determine an adjustment to the initial driving information for the specialized type of vehicle along the planned traffic route. The computer program instructions are also configured to, when executed, cause the apparatus to create specialized driving information based on the initial driving information and the adjustment that was determined. The computer program instructions are still further configured to, when executed, cause the apparatus to cause the specialized driving information relating to the planned traffic route for the specialized type of vehicle to be provided.

In an example embodiment, the adjustment is based on vehicle progress information from a set of reference trips made by vehicles of the specialized type of vehicle. In such an embodiment, the adjustment may be further based on a performance factor of the specialized type of vehicle associated with traffic flow. In another example embodiment, the adjustment is further based on a performance factor of the specialized type of vehicle associated with at least one of a speed limit, a maneuver type, a traffic incident, a time of day, a weather condition, a road type, a road surface, or a number of lanes.

In an example embodiment, the adjustment is determined using a machine learning algorithm trained using the set of reference trips made by vehicles of the specialized type of vehicle. In another example embodiment, the adjustment is determined for at least one individual road link of the planned traffic route. In still another example embodiment, the specialized driving information includes at least one of a time to destination, an estimated speed, or an alternate route. In another example embodiment, the computer program instructions are also configured to, when executed, cause the apparatus to update the set of reference trips by adding actual driving information gathered during a trip by the specialized type of vehicle on the planned traffic route.

In yet another example embodiment, a computer program product is provided that includes at least one non-transitory computer-readable storage medium having computer-executable program code portions stored therein with the computer-executable program code portions including program code instructions configured to create traffic information for a specialized type of vehicle. The computer-executable program code portions include program code instructions configured to receive initial driving information for a generic type of vehicle along a planned traffic route, wherein the generic type of vehicle travels along the planned traffic route in larger numbers than the specialized type of vehicle. The computer-executable program code portions also include program code instructions configured to determine an adjustment to the initial driving information for the specialized type of vehicle along the planned traffic route. The computer-executable program code portions further include program code instructions configured to create specialized driving information based on the initial driving information and the adjustment that was determined. The computer-executable program code portions still further include program code instructions configured to cause the specialized driving information relating to the planned traffic route for the specialized type of vehicle to be provided.

In an example embodiment, the adjustment is based on vehicle progress information from a set of reference trips made by vehicles of the specialized type of vehicle. In such an embodiment, the adjustment may be further based on a performance factor of the specialized type of vehicle associated with traffic flow. In another example embodiment, the adjustment is further based on a performance factor of the specialized type of vehicle associated with at least one of a speed limit, a maneuver type, a traffic incident, a time of day, a weather condition, a road type, a road surface, or a number of lanes.

In an example embodiment, the adjustment is determined using a machine learning algorithm trained using the set of reference trips made by vehicles of the specialized type of vehicle. In another example embodiment, the adjustment is determined for at least one individual road link of the planned traffic route. In still another example embodiment, the specialized driving information includes at least one of a time to destination, an estimated speed, or an alternate route. In another example embodiment, the computer code instructions are further configured to update the set of reference trips by adding actual driving information gathered during a trip by the specialized type of vehicle on the planned traffic route.

In an example embodiment, an apparatus is provided for creating traffic information for a specialized type of vehicle. The apparatus includes means for receiving initial driving information for a generic type of vehicle along a planned traffic route, wherein the generic type of vehicle travels along the planned traffic route in larger numbers than the specialized type of vehicle. The apparatus also includes means for determining an adjustment to the initial driving information for the specialized type of vehicle along the planned traffic route. The apparatus further includes means for creating specialized driving information based on the initial driving information and the adjustment that was determined. The apparatus still further includes means for causing the specialized driving information relating to the planned traffic route for the specialized type of vehicle to be provided.

In an example embodiment, the adjustment is based on vehicle progress information from a set of reference trips made by vehicles of the specialized type of vehicle. In such an embodiment, the adjustment may be further based on a performance factor of the specialized type of vehicle associated with traffic flow. In another example embodiment, the adjustment is further based on a performance factor of the specialized type of vehicle associated with at least one of a speed limit, a maneuver type, a traffic incident, a time of day, a weather condition, a road type, a road surface, or a number of lanes.

In an example embodiment, the adjustment is determined using a machine learning algorithm trained using the set of reference trips made by vehicles of the specialized type of vehicle. In another example embodiment, the adjustment is determined for at least one individual road link of the planned traffic route. In still another example embodiment, the specialized driving information includes at least one of a time to destination, an estimated speed, or an alternate route. In another example embodiment, the apparatus also includes means for updating the set of reference trips by adding actual driving information gathered during a trip by the specialized type of vehicle on the planned traffic route.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings which are not necessarily drawn to scale, and wherein:

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus and computer program product are provided in accordance with an example embodiment of the present disclosure for facilitating the driving of a first type of vehicle, referenced as a specialized type of vehicles herein. Specialized vehicles, or those that are different in size or function from a second type of vehicle, such as traditional automobiles, trucks, sport utility vehicles or other full sized passenger vehicles, often have vastly different driving experiences along a route than the second type of vehicles, referenced as a generic type of vehicles herein, do along the same route. These differences may become noticeable when the specialized type of vehicles uses traffic information based on the experience of the generic type of vehicles to plan and predict planned routes of travel, such as provided by a navigation system. Most information created by mapping systems is independent of the type of vehicle and therefore is usually most accurate for the generic type of vehicle, such as traditional automobiles, trucks, sport utility vehicles or other full sized passenger vehicles, since the generic type of vehicles travel along the planned traffic route in larger numbers than the specialized type of vehicles and, as a result, provide more probe data upon which the traffic information is based. However, specialized types of vehicles, including undersized vehicles, such as mopeds, scooters, Segway personal transports, or the like, and oversized vehicles, such as delivery trucks, are often not accounted for in large enough amounts and therefore navigation assistance may be inaccurate for these specialized types of vehicles. The relatively small comparative representation of specialized vehicles on the road may make getting accurate driving information difficult since aggregation of probe data from the vehicle is a large aid in creating accurate traffic information. The present disclosure aims to use existing data for generic type of vehicles to create driving information for specialized types of vehicles, but to do so in a manner that adjusts the driving information to be adapted for specialized types of vehicles.

Figure 1:
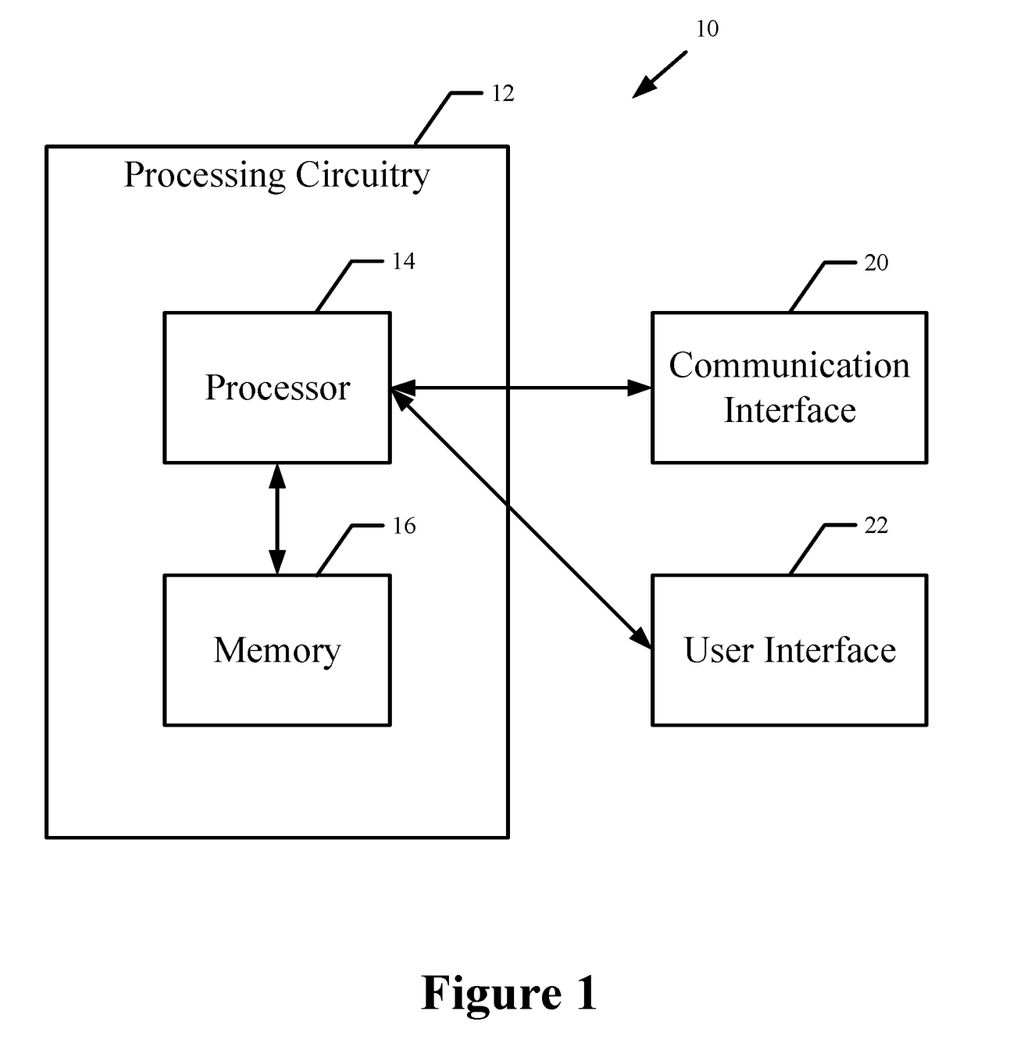
FIG. 1 is a block diagram of an apparatus according to an example embodiment of the present disclosure.

FIG. 1 is a schematic diagram of an example apparatus configured for performing any of the operations described herein. Apparatus 10 is an example embodiment that may be embodied by or associated with any of a variety of computing devices that include or are otherwise associated with a device configured for providing advanced driver assistance features which may include a navigation system user interface. For example, the computing device may be a computing device, such as an infotainment system, a built-in vehicular navigation device, an assisted driving device, or the like. Some embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In an embodiment where some level of vehicle autonomy is involved, the apparatus 10 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be an Advanced Driver Assistance System module (ADAS) which may at least partially control autonomous or semi-autonomous features of a vehicle.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 10 may be equipped or associated with any number of sensors (not shown), such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 10, such as by near field communication (NFC) including, but not limited to, Bluetooth™ communication, or the like.

The apparatus 10 may include, be associated with, or may otherwise be in communication with a communication interface 20, processor 14, a memory device 16 and a user interface 22. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device such as the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 22. The user interface may include a touch screen display, a speaker, physical buttons, and/or other input/output mechanisms. In an example embodiment, the processor 14 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 10 may interpret positioning data collected by its sensors and provide a destination preview including visual and audio feedback, to a user, for example.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 20 may be configured to communicate over wireless communication protocols including Global System for Mobile Communications (GSM), such as but not limited to Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired communication and/or may alternatively support vehicle to vehicle or vehicle to infrastructure wireless links.

The apparatus 10 may support a mapping or navigation application so as to present maps or otherwise provide navigation or driver assistance, such as in an example embodiment in which map data is created or updated using methods described herein. For example, the apparatus 10 may provide for display of a map and/or instructions for following a route within a network of roads via user interface 22. In order to support a mapping application, the computing device may include or otherwise be in communication with a map database, such as the map database 340 shown in FIG. 3. The map database may be stored in memory 16. For example, the map database may include node data records, road segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, the user interface 22 may be provided as a navigation system to provide driver assistance to a user traveling along a network of roadways whose geometry and details may be generated and/or updated according to methods described herein. The navigation system may allow the user to input the vehicle type or the apparatus may be configured to determine the vehicle type, such as a generic type of vehicle or a specialized type of vehicle. In some embodiments, a navigation system may be configured to be dedicated to one or more types of vehicle exclusively. In an example embodiment, a navigation system is in communication with the network and/or map database in order to be updated based on the vehicle type desired.

Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

HD maps have a high precision at resolutions that may be down to several centimeters that identify objects proximate a road segment, and features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly. The information gathered may be aggregated with information from other vehicles to create a more robust map.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be used with other sensor data from other vehicles to create more reliable mapping information. When data is being gathered from multiple sensors, and in this case multiple vehicle types, the data may prove unreliable for vehicles with a low share of representation. In this regard, the sensor data may be unreliable or less reliable for those types of vehicles, that is, specialized types of vehicles, which travel the road network in smaller numbers and, therefore, provide less sensor data than other types of vehicles, such as generic types of vehicles that travel the road network in larger numbers. The present disclosure uses this information provided by a generic type of vehicle to create reliable driving information for specialized vehicles. In some cases, an autonomous vehicle may be classified as a specialized vehicle, as its behavior in traffic may exhibit some unique characteristics. For instance, autonomous vehicles may implement reliable and standardized ways of negotiating intersections, reacting to traffic light changes, adhering to speed limits, predicting acceleration, and/or braking profiles which may result in specialized estimated time of arrival (ETA) estimates for such specialized types of vehicles deviating from the "bulk data" based estimates premised on data collected by a generic type of vehicle.

Figure 2:
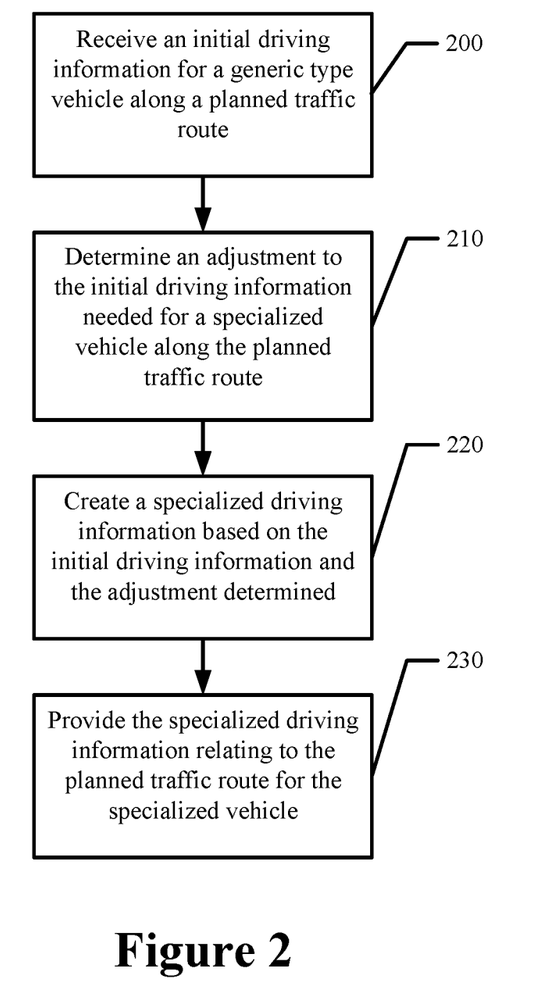
FIG. 2 is a flowchart of operations for creating traffic information for specialized vehicles according to an example embodiment of the present disclosure.

Referring now to FIG. 2, the operations performed by the apparatus 10 of an example embodiment are depicted. As shown in Block 200 of FIG. 2, the apparatus of an example embodiment includes means, such as the processing circuitry 12, processor 14, or the like, for receiving an initial driving information for a generic type of vehicle along a planned traffic route. Driving information may include any information relating to road class, road surface type, number of lanes on the road, area of city being traveled, junction type, traffic conditions, or a combination thereof. In some embodiments, this driving information may include estimated drive times. In some embodiments, this initial driving information may be based on real time information about vehicles traveling along a planned route. Additionally or alternatively, the initial driving information may be based on historical information about vehicles along a planned route. In some embodiments, the initial driving information may be gathered from one or more vehicles that previously traveled along the same or similar route. The initial driving information may be provided either by, or in part by, the map database 340, described in more detail in reference to FIG. 3 below.

The initial driving information for a generic type of vehicle may come from all types of vehicles including average sized vehicles (e.g., private car) and specialized vehicles (e.g., fleets of delivery vehicles of different sizes). In some embodiments, the amount of generic types of vehicles will be substantial enough that the generic vehicle information may reliably be used by generic types of vehicles. In some cases, the initial driving information may be a filtered data set (e.g., the filtering may aim to obtain probe data that corresponds to typical private passenger car behavior without a guarantee that the filtered data actually comes from a passenger vehicle). For example, this filtering may be done because even taxis, which have the dimensions of passenger vehicles, may be allowed to use high occupancy vehicle (HOV) lanes, public transportation lanes, etc. In the example of the taxi data, the dataset may be labeled as taxi data, which may not be taken into account for the traffic estimate since the behavior of a taxi may not be representative of the behavior of a generic type of vehicle.

A generic type of vehicle may be any vehicle that is not substantially helped or harmed in traveling based on size and/or function. In some embodiments, the generic type of vehicles may be defined as a given range of vehicle sizes that the majority of vehicles on the road make up (e.g., 75% of the vehicles on the road may be compact). In an example embodiment, a generic type of vehicle may be defined as all vehicles within a certain range of sizes (e.g., all vehicles that are greater than 4 feet across in width and less than 8 feet across in width may be designated as a generic type of vehicle). Other potential factors that may determine whether a vehicle is considered a generic type of vehicle include vehicle length, maximum speed, function, number of wheels, or the like. In some embodiments, the generic type of vehicle may be defined using government classifications (e.g., the United States defines vehicle size based on weight and/or interior space). Additionally or alternatively, the generic type of vehicle may be defined by the type of license required to operate said vehicle (e.g., vehicles requiring a class B license in Europe may be considered a generic type of vehicle). In various embodiments, the determination of what qualifies as a generic type of vehicle is dynamic (e.g., the generic type of vehicle may be based on the vehicle type that makes up the majority of vehicles on a given road). In some embodiments, the generic type of vehicles may actually be a vehicle commonly thought as a specialized vehicle (e.g., some roads have more travel from mopeds due to the size of the road and therefore it may be easier to get driving information for mopeds on the route than other vehicles). The processor may determine what qualifies as a generic type of vehicle, such as based upon information identifying the types of vehicles that use the roadway and their respective usage percentage, or the generic type of vehicle may be predetermined. In some embodiments, the driving information received by the apparatus, such as from the map database 340, may determine what falls into the category of a generic type of vehicles and what does not.

The planned route may be any stretch of road a vehicle is predicted to travel along at a point in the future. In some embodiments, the projected route may be designated by a user of a specialized vehicle. In an example embodiment, the processor 14 or the like may be configured to create a planned route based on the input of a user and/or a predictive computation by the apparatus. In some embodiments, the predictive computations by the processor or the like may be based on past routes made by the vehicle and/or frequent routes by that vehicle type. The planned route may include multiple routes in order to compare the travel time along each path (e.g., there may be two options for reaching a destination and the apparatus creates specialized driving information for both to determine which option is the better choice).

As shown in Block 210 of FIG. 2, the apparatus of an example embodiment includes means, such as the processing circuitry 12, processor 14, or the like, for determining an adjustment to the initial driving information for a specialized vehicle along the planned traffic route. An adjustment may be any change to the driving information that increases the accuracy of the driving information for a specialized vehicle.

In some embodiments, the adjustment may be to some or all of the driving information for a generic type of vehicles. In some embodiments, the adjustment may include changes in time to destination. The adjustments may be made either to an entire route or to individual links of the route (e.g., there may be busy and non-busy streets along a planned route).

In some embodiments, the adjustment may be based on one or more factors including type of specialized vehicle, time of day, day of week, level of traffic, road class, road surface types, roads with different lane numbers, road location, road condition, junction types, speed limit, and the like. In various embodiments, these factors may have varying degrees of weight in the determination of the adjustment. The weight given to each factor may be determined by localized knowledge of the area and/or continuous adjustment through machine learning, discussed below. For example, in an example embodiment, the road class and vehicle type may be the two most important factors and therefore are weighted more heavily, or in some cases may be the only factors considered. In some embodiments, the vehicle type or the road class, or any other factor, alone may be the only consideration for the adjustment (e.g., the same adjustment may be made to all driving information for a particular type of vehicle regardless of road class or otherwise). The adjustment may be different for various types of specialized vehicles along the same route (e.g., mopeds may need different adjustments than delivery trucks).

Figure 4:
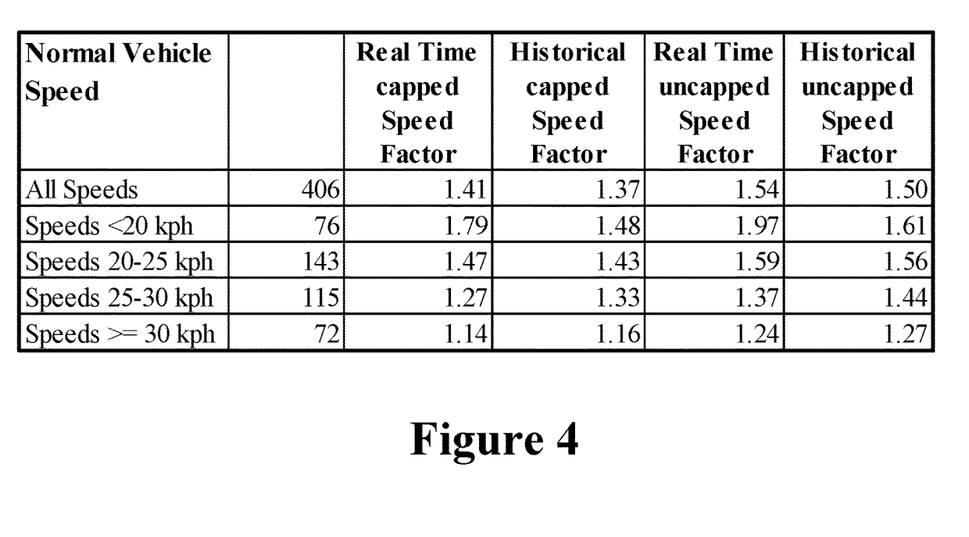
FIG. 4 is a chart illustrating test data of an example embodiment of the present disclosure.
Figure 5:
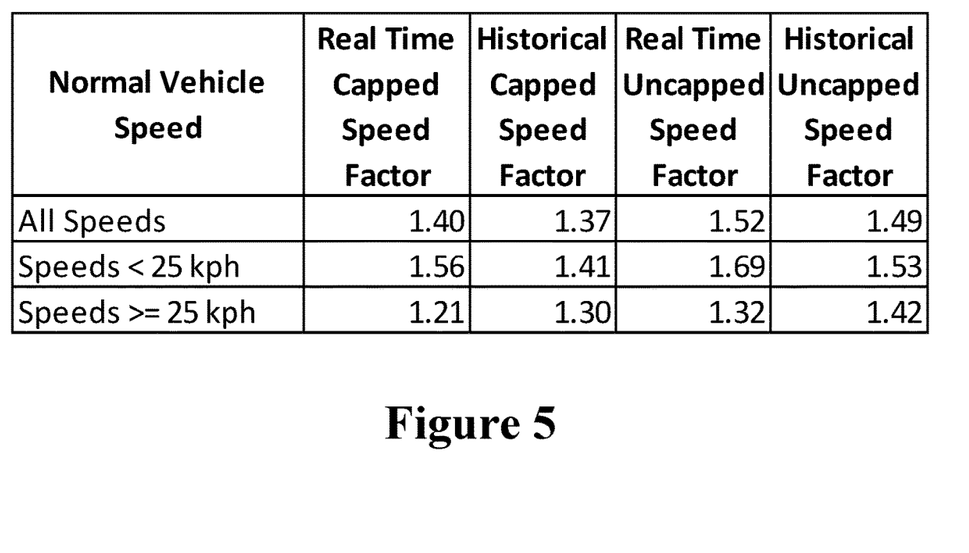
FIG. 5 is a chart illustrating test data of another example embodiment of the present disclosure.

As discussed in more detail in reference to FIGS. 4 and 5, the adjustment may be created using a predetermined performance factor. The performance factor may be created using vehicle progress information from a set of reference trips made by specialized type of vehicles. The vehicle progress information may include information relating to a plurality of trips along a specific road by one or more specialized vehicle type (e.g., data relating to scooters over a given road may be recorded for a set length of time). The vehicle progress information may be specific to travel time, comparisons to other vehicle types, and the like. In some embodiments, the actual driving information about a completed route of a specialized vehicle may be used to update or generate a new performance factor (e.g., if an example embodiment predicts a route will take a specialized vehicle 10 minutes and actually takes 15 minutes, then the performance factor may be reduced to account for the longer travel time). Once the performance factor has been determined, the apparatus, such as the processor, of this example embodiment is configured to combine the performance factor with the initial driving information, such as by multiplying or dividing the initial driving information, such as the estimated length of time to traverse a route, by the performance factor. However, the performance factor may be used in other manners to create the specialized driving information from the initial driving information in other embodiments.

In some embodiments, adjustments may be made for each individual link on a route, checking which links of a road network are part of the route and the individual adjustments due to features of the links and involved maneuvers. The length of a given link may be different based on the apparatus configuration (e.g., in some cases, a link may be defined between intersections, while in some cases a link may be defined in uniform distances). For example, a useful part of the ETA calculation may be to analyze the route link-wise, to determine which attributes of the link and/or how the vehicle type-dependent adjustment needs to be applied in view of the different link attributes.

Figure 3:
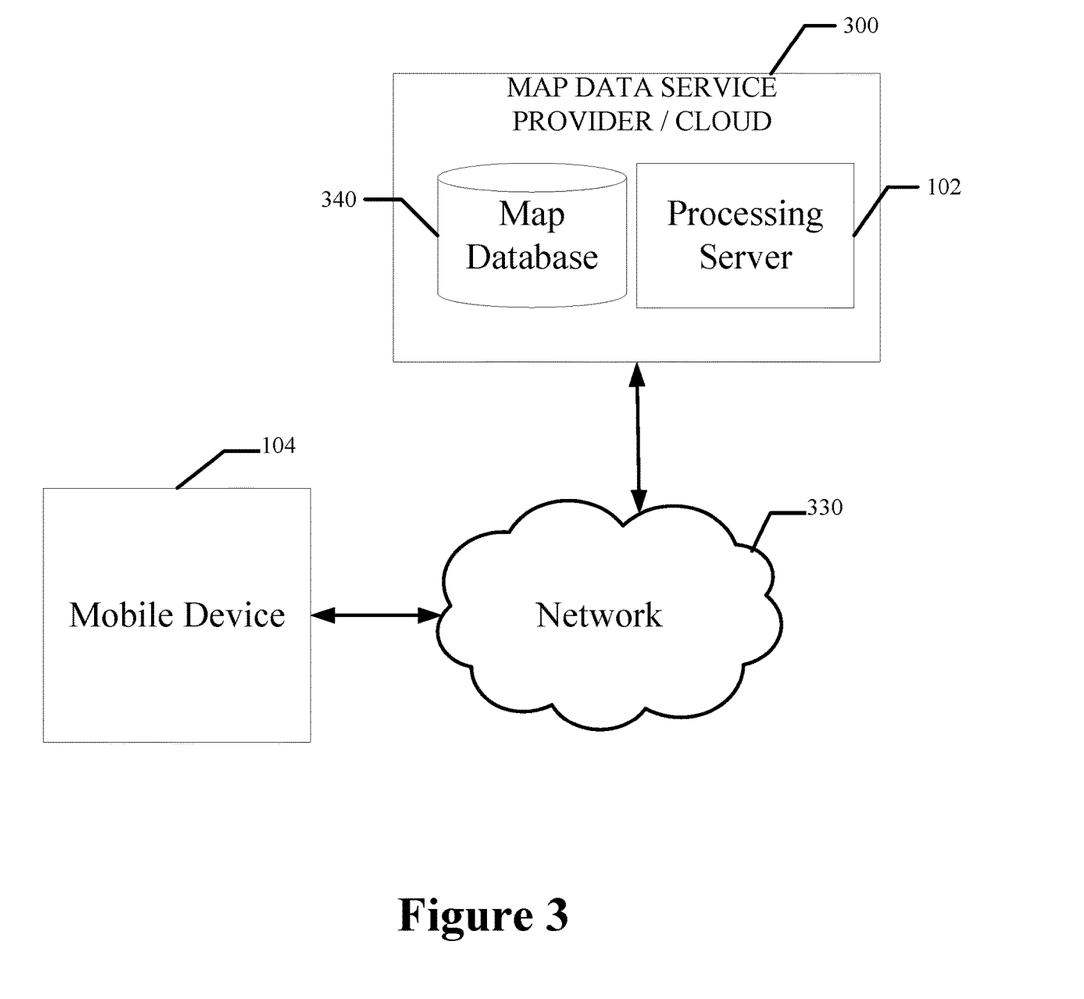
FIG. 3 is a block diagram of a system for creating traffic information for specialized vehicles according to an example embodiment of the present disclosure.

In some embodiments, the map database 340 may already have driving information for the specialized vehicle along a route (e.g., for busy roads, there may be enough specialized vehicles traveling along the road to allow an example embodiment to update the driving information directly). In such a case, an example embodiment, may provide the previously determined driver information for the specialized type of vehicle. In some embodiments, such as when there is not predetermined driving information for a route for a specialized vehicle, the apparatus may then look for an adjustment made on similar roads for similar specialized vehicles (e.g., the adjustment for a moped on a stretch of interstate may be similar to the adjustment for a moped on a different stretch of similar interstate). In some examples, there may not be an exact comparable adjustment and the processor may have to interpolate the adjustment based on multiple possible adjustments. In some embodiments, the interpolation may be linear (e.g., discrete/binary values may be present, so that a value may be chosen). Alternatively or additionally, the interpolation may be more complex than linear (e.g., quadratic interpolation may be used when the lane count doubles).

As noted above, a specialized types of vehicle may be any vehicle that does not fall into the generic type of vehicles, such as average sized vehicles, for a given embodiment. Therefore, vehicles that fall into the category of specialized vehicle may change based on how the generic type of vehicles are defined (e.g., vehicles outside of a certain width range may be considered specialized). In some embodiments, there may be multiple subcategories of specialized vehicles (e.g., there may be a subcategory for undersized vehicles and another subcategory for oversized vehicles). The user may input information to determine the type of vehicle or the apparatus may be able to determine the vehicle type without user input (e.g., the apparatus can detect the vehicle type based on the motion of the vehicle). The specialized driving information produced may be across all specialized vehicles or across a subcategory of specialized vehicles. In some embodiments, the type of vehicle for which the apparatus determines the specialized driving information may be predetermined (e.g., an in-vehicle navigation system may be set specifically to create driving information for the type of vehicle that it is carried by). In an example embodiment, the type of vehicle for which the apparatus determines the specialized driving information may be changeable (e.g., a mobile device may allow the user to input the specific type of vehicle). In some embodiments, specialized vehicles may include undersized vehicles, such as mopeds, electric scooters, motorcycles, or the like. In various embodiments, specialized vehicles may include oversized vehicles, such as delivery trucks, tractor-trailers, and the like.

In some embodiments, different subcategories may have different levels of accuracy (e.g., more specific subcategories may not have enough data points to give accurate adjustments). In such embodiments, the user of the vehicle may be able to define either a category or specific subcategory based on the desired level of accuracy (e.g., a moped driver may select the type of specialized vehicle as two wheeled vehicles which may have more data points or may select the type of specialized vehicle as moped specifically, which may not have as many data points but each data point is more relevant). In some embodiments, the processor or the like may be in communication with the map database to determine whether there is sufficient data for a specific subcategory to be used (e.g., some road types may have enough moped specific data to give accurate adjustments using such data, while others may not). In various embodiments, a specialized vehicle type may not have a large enough usage rate to produce reliable driving information for that vehicle type and then may need to use a broader category or subcategory of specialized vehicles. In such cases, the apparatus may use driving information from similar conditions or use a different specialized category or subcategory if possible. For example, the size, max speed, acceleration, and/or weight of the vehicle may be used to place specialized vehicles into specific subcategories (e.g., scooters and motorcycles may have vastly different max speeds and therefore may not be as accurate in determining the adjustment for one another).

As shown in Block 220 of FIG. 2, the apparatus of an example embodiment includes means, such as the processing circuitry 12, processor 14, or the like, for creating specialized driving information based on the initial driving information and the adjustment determined. Specialized driving information may be any information about driving along a planned route that is normalized in some way for one or more types of specialized vehicle. As such, the specialized driving information may include the same type of data as the initial driving information for generic type of vehicles, discussed above, with the only difference being some type of normalization for specialized vehicles. In an example embodiment, the specialized driving information may include one or more of a time to destination, an estimated speed, or an alternate route. In some embodiments, specialized vehicles may include undersized vehicles, such as mopeds, electric scooters, motorcycles, Segway personal transports, or the like, and/or oversized vehicles, such as delivery trucks and tractor-trailers. In some embodiments, as discussed in relation to generic type of vehicles above, specialized vehicles may be defined independent of size. In some embodiments, the specialized driving information will be based on a combination of the initial driving information for a generic type of vehicle along a planned route and the adjustment determined.

As discussed in reference to the adjustment above, there may be various different factors considered in determining the adjustment. In some embodiments, there may be more weight given to the initial driving information for generic type of vehicles than the recommended adjustment (e.g., when the confidence rate of the adjustment is low, the apparatus may revert to the driving information for a generic type of vehicle). In various embodiments, the planned route may not be similar to any specialized information that the map database possesses (e.g., there is a new type of road that is completely different than the road types of data in the map database) and the apparatus may determine to combine multiple adjustments to create the specialized driving information. In some embodiments, there may be specialized driving information for various subcategories of specialized vehicles (e.g., there may be distinct driving information for both undersized and oversized vehicles). The processor and/or the user may determine which and how much driving information should be provided.

As shown in Block 230 of FIG. 2, the apparatus of an example embodiment includes means, such as the processing circuitry 12, processor 14, or the like, for providing the specialized driving information relating to the planned traffic route for the specialized vehicle. The specialized driving information may be provided to a user through a user interface 22, such as a mobile device or in-vehicle navigation system. The information may be provided, either audibly (e.g., an audible update on the length of time to destination) and/or visually (e.g., an update on the map of a navigation system that the current route is delayed). The amount of information provided about the specialized driving information may vary based on the capabilities of an example embodiment of the present disclosure. The information provided may include time to destination, traffic conditions, alternate routes, preferred lanes, and/or the like. In some embodiments, the user may be able to select what information may be communicated to them about the specialized driving information (e.g., a driver may care about the time to destination and not about other information about the driving information). In various embodiments, such as those in connection with fully or partially autonomous vehicles, the specialized driving information may be provided to the vehicle itself, or the processor therein, in order to update the route of the vehicle. Some or all of the driving information may also be communicated to the passengers of the vehicle, similarly to above.

In various embodiments, the apparatus may be able to update the map database based on previous uses. For example, in some embodiments the apparatus may be configured to collect information about the completed routes of the specialized vehicle in order to compare the collected information to the specialized driving information predicted. In such embodiments, this comparison may be used to determine the accuracy of the adjustment. In some embodiments, the comparison may be used to update the apparatus in order to improve future adjustments. In various embodiments, the map database 340, discussed in more detail in relation to FIG. 3, may be updated based on the comparison therein.

In some embodiments, autonomous vehicles may be equipped with an example embodiment of the apparatus. In such cases, autonomous vehicles may follow a route that may have been built using adjusted traffic information. The adjustment may affect the operation of the autonomous vehicle, directly or indirectly. For example, the autonomous vehicle may display the remaining travel time to destination to its passengers.

Referring now to FIG. 3, a map service provider database may be used to provide driver assistance via a navigation system and/or through an ADAS having autonomous or semi-autonomous vehicle control features. FIG. 3 illustrates a communication diagram of an example embodiment of a system for implementing example embodiments described herein. The illustrated embodiment of FIG. 3 includes a mobile device 104, which may be embodied as at least a portion of the user interface 22 in an example embodiment of the apparatus 10 shown in FIG. 1. The mobile device may include a mobile phone, an in-vehicle navigation system, an ADAS, or the like. A map data service provider or cloud service 300 is also provided in the illustrated embodiment. Each of the mobile device 104 and map data service provider 300 may be in communication with at least one of the other elements illustrated in FIG. 3 via a network 330, which may be in the form of a wireless, either fully or partially, and/or wired network as will be described further below. Additional, different, or fewer components may be provided. For example, many mobile devices 104 may connect with the network 330. The map data service provider 300 may provide cloud-based services and/or may operate via a hosting server that receives, processes, and provides data to other elements of the system.

The map data service provider 300 may include a map database 340 that may include node data, road segment data or link data, point of interest (POI) data, traffic data or the like. The map database 340 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 340 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 340 can include data about the POIs and their respective locations in the POI records. The map database 340 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 340 can include event data (e.g., traffic incidents, construction activities, scheduled events, unscheduled events, etc.) associated with the POI data records or other records of the map database 340. The map database 340 may also contain information about various roads including road class, road surface types, number of lanes, zoning around roads, junction types, and the like. In some embodiments, the map database 340 may contain information relating to differences in traffic patterns based on factors such as the level of traffic, time of day, day of week, or the like.

The map database 340 may be maintained by a content provider e.g., the map data service provider and may be accessed, for example, by the content or service provider processing server 102. By way of example, the map data service provider can collect geographic data and dynamic data to generate and enhance the map database 340 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 340 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form map database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 340 may be a master map database, but in alternate embodiments, a client side map database may represent a compiled navigation database that may be used in or with end user devices (e.g., mobile device 104) to provide navigation and/or map-related functions. For example, the map database 340 may be used with the mobile device 104 to provide an end user with navigation features. In such a case, the map database 340 can be downloaded or stored on the end user device which can access the map database 340 through a wireless or wired connection, such as via a processing server 102 and/or the network 330, for example.

The map database 340 may also have information relating to specialized vehicles along certain routes. This information may be based on the type of specialized vehicle, road class, road surface type, number of lanes on the road, traffic information, the time of day, the day of the week, the size of the road, or the like. As discussed herein, the map database may provide this information to the processor circuitry 12, which may then provide information about a planned route for a specialized vehicles. The map database may get this information from the network 330 or have it stored in the apparatus, such as in the memory device 16. The information relating to specialized vehicles may be combined with information from other vehicles, both specialized and generic types of vehicles. In an example embodiment, the information relating to specialized vehicles along certain routes may include one or more performance factors. In some embodiments, the performance factor may be based on a set of reference trips made by specialized vehicles along a given road. The map database may contain some of the information about the reference trips. Additionally or alternatively, the map database may contain one or more performance factors.

In one embodiment, as noted above, the apparatus 10 of FIG. 1 can be embodied by an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. In some embodiments, the map data service provider is embodied together as one device, such as a navigation system. In such cases, the components may be connected through wired, wireless, or a combination of wired and wireless connections.

Referring now to both FIGS. 4 and 5, test data to be used by an example embodiments of the present disclosure is shown. In the data shown in FIG. 4, the specialized vehicle being monitored was a moped. The data was collected over a 3 day period along a 2.5 kilometer stretch of road during weekdays. The data, an example of a reference trip, was compiled and then transformed to create a performance factor to use in determining the traffic information for a specialized vehicle. The performance factor may be used by an example embodiment to determine the correct adjustment to be to the driving information of generic type of vehicles to create driving information for specialized vehicles. In order to adjust the driving information of a generic type of vehicle, the performance factor may be combined with the driving information, such as by being mathematically combined, such as by addition, multiplication or division, or by otherwise being combined or used to determine the specialized driving information for the specialized type of vehicle. A performance factor may be based one or more of the type of specialized vehicle, time of day, day of week, level of traffic, road class, road surface types, roads with different lane numbers, road location, road condition, junction types, speed limit, and the like. In some embodiments, the apparatus itself may make the determination of a performance factor, while in other embodiments, the performance factors may be predetermined (e.g., the apparatus may be able to collect data to create or update performance factors or may merely receive performance factors from the memory device 16, network 330, or the like). In various embodiments, there may be many performance factors for each specialized vehicle along different routes. In some embodiments, the performance factor may be constant for every type of specialized vehicle.

As shown in FIG. 4, the apparatus may use the same performance factor regardless of the vehicle speed of the generic type of vehicle on the planned route or may use a specific performance factor based on the range of speeds of the generic type of vehicles along the planned route (e.g. a moped traveling in traffic where a generic type of vehicle is currently, and/or normally would travel less than 20 kilometers per hour (kph), may use the performance factor for the <20 kph category or the all speeds category). In this example, the performance factor may be used by dividing the speed, e.g., the average speed, of a generic type of vehicle as provided by the initial driving information by the performance factor to determine the speed of a specialized type of vehicle. Additionally, there may be different performance factors based on the various information used. For example, in this case there are performance factors using real time data and performance factors using historical data. Within each of these subdivisions, there may be a capped or uncapped performance factor. The uncapped performance factor for each does not take into consideration the speed limit or maximum speed capabilities of the specialized vehicle, while the capped performance factor may take these limitations into consideration (e.g., a moped may not be able to travel above a certain speed and therefore it does not matter how clear the path is for the vehicle, they cannot travel above said speed). The data may be used to assist improving driving information for other similar vehicles, such as motorcycles, bicycles, electric scooters, or the like.

Referring now to FIG. 5, more test data to be used by another example embodiment of the present disclosure is shown. In this example, similar to the test data shown in FIG. 4, the specialized vehicle being monitored was a moped. The data, another example of a reference trip, was collected over a 3 day period along a 4 kilometer stretch of road during weekdays. The data was compiled and then transformed using an example embodiment of the present disclosure to create performance factors to use along the route in various situations. For example, the performance factor may be different based on the speed of travel down a route for generic type of vehicles (e.g., when cars are going slow, smaller mopeds may be able to maneuver around them easier). Additionally, the performance factor may come from real time traffic information, historical traffic information, or a combination thereof. The performance factor may be used to create the adjustment to the initial driving information (e.g., the time to destination for a generic type of vehicle may be combined with the performance factor such as by being divided by the performance factor to determine the time to destination for the specialized vehicle). The user may be able to select which performance factor to use at any given time (e.g., user may choose to use real time data when traffic is abnormal compared to historical). In some embodiments, the apparatus, such as by the processor 14 or the like, may determine which performance factor to use. In some embodiments, the performance factor to be used may be predetermined.

In some embodiments, the performance factor is combined with the initial driving information directly in order to create the specialized driving information for the specialized vehicle (e.g., SpecializedDrivingInfo=InitialDrivingInfo* PerformanceFactor) wherein * represents any of various mathematical operations. In various embodiments, the performance factor may be combined with other information to determine the specialized driving information. For example, the adjustment based on the performance factor may be associated with at least one of a speed limit, a maneuver type, a traffic incident, a time of day, a weather condition, a road type (e.g., material used to make roads), a road surface (e.g., potholes, bumps, or other surface features), or a number of lanes. In some cases, other non-traffic flow related data may be used to derive the required adjustment (e.g., how a scooter behaves when confronted with such specific conditions on the route). In some embodiments, as discussed above, the performance factor may be created using a set of reference trips made by the vehicles. In some cases, the set of reference trips will be updated based on the actual driving information obtained from an example apparatus after trip is complete.

In some embodiments, the apparatus, such as the processor, may update one or more performance factors using machine learning. For example, the apparatus, such as the processor, may be configured to find the deviations between the generic traffic information and the reference routes for the specialized vehicles. Through machine learning, the apparatus, such as by the processor, can determine the appropriate adjustment to be made so that the specialized driving information is aligned with the initial driving information, that is, the generic traffic information. In an example embodiment wherein the apparatus, such as the processor, uses a machine learning algorithm, a larger set of link attributes may be considered to generate the adjustments. While a traffic expert may propose a model considering a limited list of important link attributes to observe in the reference routes, a training set for a supervised machine learning algorithm may comprise all (or a large portion of) available link attributes in map database 340. By using the larger set of attributes, the machine learning algorithm may be able to determine relations between link attributes and performance factors previously unknown to traffic experts. In some embodiments, the machine learning may use supervised methods, such as linear regression, to provide accurate results. However, other methods such as Support Vector Machines, logistic regression, naive Bayes, linear discriminant analysis, decision trees, k-nearest neighbor algorithm, and Neural Networks (Multilayer perceptron) may be used.

The automation of driving, both assisting and supplanting humans, has become a focus of recent technology with advances in machine learning, computer vision, and computing power able to conduct real-time mapping. Accurate traffic information enables vehicles to travel more efficiently. Specifically, when specialized vehicles are also allowed accurate traffic information, the travel experiences for all may be improved. Specialized vehicles may be able to take routes that may not be the fastest route for generic types of vehicles, which can improve the efficiency of specialized vehicles and also increases the efficiency of generic types of vehicles as there may be less congestion on their fastest route. Maps, such as those described herein, help to increase the efficiency of vehicles and when specialized vehicles are able to receive accurate information, then all vehicles may benefit. The present disclosure allows traditionally marginalized vehicle types, e.g., specialized types of vehicles, which do not typically have high enough usage rates to get reliable traffic data, to have improved driving information, such as mapping and navigation service.

As described above, FIG. 2 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of an apparatus employing an embodiment of the present disclosure and executed by the processing circuitry 12, the processor 14 or the like of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for creating traffic information for a specialized type of vehicle, the method comprising:
   receiving initial driving information for a generic type of vehicle along a planned traffic route, wherein the generic type of vehicle travels along the planned traffic route in larger numbers than the specialized type of vehicle, wherein the generic type of vehicle includes one or more vehicle types with at least one of the one or more vehicle types being a non-specialized type;
   determining an adjustment to the initial driving information for the specialized vehicle type of vehicle along the planned traffic route,
   creating specialized driving information based on the initial driving information and the adjustment that was determined; and
   causing the specialized driving information relating to the planned traffic route for the specialized type of vehicle to be provided.

2. The method according to claim 1, wherein the adjustment is based on vehicle progress information from a set of reference trips made by vehicles of the type specialized type of vehicle.

3. The method according to claim 2, wherein the adjustment is further based on a performance factor of the specialized type of vehicle associated with traffic flow.

4. The method according to claim 2, wherein the adjustment is further based on a performance factor of the specialized type of vehicle associated with at least one of a speed limit, a maneuver type, a traffic incident, a time of day, a weather condition, a road type, a road surface, or a number of lanes.

5. The method according to claim 2, wherein the adjustment is determined using a machine learning algorithm trained using the set of reference trips made by vehicles of the specialized type of vehicle.

6. The method according to claim 2, further comprising updating the set of reference trips by adding actual driving information gathered during a trip by the specialized type of vehicle on the planned traffic route.

7. The method according to claim 1, wherein the adjustment is determined for at least one individual road link of the planned traffic route.

8. The method according to claim 1, wherein the specialized driving information includes at least one of a time to destination, an estimated speed, or an alternate route.

9. An apparatus for creating traffic information for a specialized type of vehicle, the apparatus comprising at least one processor and at least one non-transitory memory including computer program code instructions, the computer program code instructions configured to, when executed, cause the apparatus to:
receive an initial driving information for a generic type of vehicle along a planned traffic route, wherein the generic type of vehicle travels along the planned traffic route in larger numbers than the specialized type of vehicle, wherein the generic type of vehicle includes one or more vehicle types with at least one of the one or more vehicle types being a non-specialized type;
determine an adjustment to the initial driving information for the specialized type of vehicle along the planned traffic route,
create a specialized driving information based on the initial driving information and the adjustment that was determined; and
cause the specialized driving information relating to the planned traffic route for the specialized type of vehicle to be provided.

10. The apparatus according to claim 9, wherein the adjustment is based on vehicle progress information from a set of reference trips made by vehicles of the specialized type of vehicle.

11. The apparatus according to claim 10, wherein the adjustment is further based on a performance factor of the specialized type of vehicle associated with traffic flow.

12. The apparatus according to claim 10, wherein the adjustment is further based on a performance factor of the specialized type of vehicle associated with at least one of a speed limit, a maneuver type, a traffic incident, a time of day, a weather condition, a road type, a road surface, or a number of lanes.

13. The apparatus according to claim 10, wherein the adjustment is determined using a machine learning algorithm trained using the set of reference trips made by vehicles of the specialized types of vehicle.

14. The apparatus according to claim 10, wherein the adjustment is determined for at least one individual road link of the planned traffic route.

15. The apparatus according to claim 10, wherein the at least one memory and computer program code are configured to, with the processor, cause the apparatus to update the set of reference trips by adding actual driving information gathered during a trip by the specialized type of vehicle on the planned traffic route.

16. The apparatus according to claim 9, wherein the specialized driving information includes at least one of a time to destination, an estimated speed, or an alternate route.

17. A computer program product for creating traffic information for a specialized type of vehicle, the computer program product comprising at least one non-transitory computer-readable storage medium having computer-executable program code portions stored therein, the computer-executable program code portions comprising program code instructions configured to:
receive initial driving information for a generic type of vehicle along a planned traffic route, wherein the generic type of vehicle travels along the planned traffic route in larger numbers than the specialized type of vehicle, wherein the generic type of vehicle includes one or more vehicle types with at least one of the one or more vehicle types being a non-specialized type;
determine an adjustment to the initial driving information for the specialized type of vehicle along the planned traffic route,
create a specialized driving information based on the initial driving information and the adjustment that is determined; and
cause the specialized driving information relating to the planned traffic route for the specialized type of vehicle to be provided.

18. The computer program product according to claim 17, wherein the adjustment is based on vehicle progress information from a set of reference trips made by vehicles of the specialized type of vehicle.

19. The computer program product according to claim 18, wherein the adjustment is further based on a performance factor of the specialized type of vehicle associated with traffic flow.

20. The computer program product according to claim 18, wherein the adjustment is further based on a performance factor of the specialized vehicle associated with at least one of a speed limit, a maneuver type, a traffic incident, a time of day, a weather condition, a road type, a road surface, or a number of lanes.

21. The computer program product according to claim 18, wherein the adjustment is determined using a machine learning algorithm trained using the set of reference trips made by vehicles of the specialized type of vehicle.

22. The computer program product according to claim 18 further comprising program code instructions gathered during a trip by the specialized type of vehicle on the planned traffic route.

23. The computer program product according to claim 17, wherein the adjustment is determined for at least one individual road link of the planned traffic route.

24. The computer program product according to claim 17, wherein the specialized driving information includes at least one of a time to destination, an estimated speed, or an alternate route.

* * * * *